(12) United States Patent
Fukui et al.

(10) Patent No.: US 7,184,882 B2
(45) Date of Patent: Feb. 27, 2007

(54) VEHICLE NAVIGATION SYSTEM

(75) Inventors: Kunihiko Fukui, Saitama (JP); Yusuke Funayose, Saitama (JP)

(73) Assignee: Honda Motor Co., Ltd, Tokyo (JP)

( * ) Notice: Subject to any disclaimer, the term of this patent is extended or adjusted under 35 U.S.C. 154(b) by 0 days.

(21) Appl. No.: 10/882,174

(22) Filed: Jul. 2, 2004

(65) Prior Publication Data

US 2005/0033507 A1  Feb. 10, 2005

(30) Foreign Application Priority Data

Jul. 7, 2003  (JP) .............................. 2003-192805

(51) Int. Cl.
*G01C 21/34*  (2006.01)
*B60T 8/172*  (2006.01)

(52) U.S. Cl. ..................... 701/200; 701/25; 340/988

(58) Field of Classification Search ............... 701/200, 701/210, 214, 25, 215, 207, 202, 205; 340/988, 340/990; 73/178 R; 342/350, 352, 357.01
See application file for complete search history.

(56) References Cited

U.S. PATENT DOCUMENTS

| | | | |
|---|---|---|---|
| 5,067,082 A * | 11/1991 | Nimura et al. ............... 701/208 |
| 6,320,496 B1 * | 11/2001 | Sokoler et al. ........... 340/407.1 |
| 6,377,889 B1 * | 4/2002 | Soest .......................... 701/207 |
| 6,454,036 B1 * | 9/2002 | Airey et al. ................. 180/167 |
| 6,634,982 B2 * | 10/2003 | Miki et al. ..................... 477/45 |
| 6,658,353 B2 * | 12/2003 | Shimizu et al. ............. 701/214 |
| 2004/0148101 A1 * | 7/2004 | Morita et al. ................ 701/211 |

FOREIGN PATENT DOCUMENTS

| | | |
|---|---|---|
| JP | 62-156821 U | 10/1987 |
| JP | 2002-350144 A | 12/2002 |

* cited by examiner

*Primary Examiner*—Dalena Tran
(74) *Attorney, Agent, or Firm*—Birch, Stewart, Kolasch & Birch, LLP

(57) ABSTRACT

A GPS-based vehicle navigation system and method for properly displaying direction guide information, which represents a target direction, regardless of forward motion or backward motion. The system calculates the current position of the vehicle, and senses the traveling direction of the vehicle. The operation mode of the system is determined. If the operation mode is a "compass mode", the orientation of the traveling direction is calculated based on the current position and the traveling direction. On the other hand, if the operation mode is a "NAVI mode", a target position T separately set is read, and a target direction is calculated based on the current position and the target position T. Next, it is determined whether the motion of the vehicle is forward or backward. If the motion of the vehicle is backward, the direction guide information is corrected by an angle equivalent to 180°.

20 Claims, 9 Drawing Sheets

| WP | POSITIONAL INFORMATION | |
|---|---|---|
| 1 | N 35.40.09.00 | E 139.43.37.5 |
| 2 | - - - - - - - - - - - - - - - - - - |  |
| 3 | - - - - - - - - - - - - - - - - - - |  |
| 4 | - - - - - - - - - - - - - - - - - - |  |
| ⋮ | ⋮ |  |
| 9 | - - - - - - - - - - - - - - - - - - |  |

| BEFORE CORRECTION | AFTER CORRECTION |
|---|---|
| N | S |
| N E | S W |
| E | W |
| S E | N W |
| S | N |
| S W | N E |
| W | E |
| N W | S E |

VEHICLE NAVIGATION SYSTEM

CROSS-REFERENCE TO RELATED APPLICATION

The present application claims priority under 35 U.S.C. §119 to Japanese Patent Application No. 2003-192805, filed Jul. 7, 2003, the entire contents of which are hereby incorporated by reference.

BACKGROUND OF THE INVENTION

1. Field of the Invention

The present invention relates to a vehicle navigation system. In particular, the present invention relates to a vehicle navigation system suitable for a compact vehicle in which a large display space is difficult to ensure.

2. Description of Background Art

Navigation systems in which the current location of a vehicle is displayed on a map by combining a position detection device (GPS: Global Positioning System) utilizing satellite radio waves and map information to guide the vehicle to a destination, are being widely used.

Heretofore, vehicle navigation systems have been mainly developed for four-wheel cars. However, in recent years, mounting vehicle navigation systems on compact vehicles, such as motorcycles and buggy cars for rough terrains, is also being studied. However, in known navigation systems, a display screen has become large as a result of the attempt to provide a large amount of information to a driver. In compact vehicles including motorcycles, it has been difficult to ensure a mounting space for a display panel within the sight of a driver.

In order to solve such a technical problem, a vehicle navigation system in which guidance information necessary for a driver can be provided in a small display space has been described in (Japanese Unexamined Patent Publication No. 2002-350144).

FIG. 10 is a view showing the configuration of a display panel of the above-described known vehicle navigation system. The display panel includes a speed display area 61, a positioning status display area 62 for displaying the positioning status of a GPS, a multiplex display area 63 which functions as an odometer and a trip meter and in which the number of the way point (WP: relay point) currently selected, the distance to the WP, and the like are displayed, and a direction display area 64 for displaying the direction of the WP or the final destination with an arrow.

Below the display panel 6, a "MODE" switch 65 for switching the operation mode of the navigation system, a "WPT" switch 66 for newly registering the current position as a WP, and an "INC" switch 67a and a "DEC" switch 67b for selecting a WP, are provided.

FIG. 11 is a view showing a display example of the display panel 6 when a vehicle is running. In the speed display area 61, a speed of "28" miles per hour is displayed. In the positioning status display area 62, positioning status is displayed. In the multiplexed display area 63, the identification number "1" of a way point WP and "1.23 (miles)," which is the distance from the current position to the way point WP1, are displayed. In the direction display area 64, an arrow indicating the direction of a destination or a WP is displayed.

The above-described known navigation system can recognize the position and the traveling direction thereof based on GPS radio waves, but cannot recognize the orientation thereof, i.e., the orientation of the display panel 6. More specifically, the navigation system cannot recognize whether the display panel 6 is oriented to north as in FIG. 12(a) or to south as in FIG. 12(b). Moreover, the navigation system shows the direction of a destination with an arrow by regarding the front direction of the display panel 6 as the traveling direction. Accordingly, when a vehicle moves in the direction opposite to a target direction, an arrow indicating the back direction of the display panel 6 is displayed in the direction display area 64 of the display panel 6 regardless of the orientation of the display panel 6.

Consequently, there has been the following technical problem: if the vehicle 100 moves forward while facing the direction opposite to the target direction T as shown in FIG. 13(a), a correct arrow directed in the target direction T is displayed in the direction display area 64 of the display panel 6, but, if the vehicle moves backward while facing the target direction, an arrow directed in the direction opposite to the target direction T is displayed as shown in FIG. 13(b).

Note that Japanese Unexamined Utility Model Publication No. Sho 62(1987)-156821 discloses a technology in which when a vehicle is moving backward, 180° is added to orientation information given by an orientation sensor, thereby properly showing a vehicle swept path even during backward motion.

However, in the above-described known navigation system, only the vehicle swept path is displayed, but it is impossible to properly display direction guide information, such as the orientation of the traveling direction and a target direction, for guiding a driver to a predetermined direction, when the vehicle is moving backward.

SUMMARY AND OBJECTS OF THE INVENTION

An object of the present invention is to solve the above-described problems of the prior art and to provide a navigation system in which direction guide information, such as a target direction and the orientation of a traveling direction, can be properly displayed regardless of forward motion or backward motion.

In order to achieve the above-described object, the present invention has a feature in that the following means are adopted in a vehicle navigation system:

(1) means for sensing a current position of a vehicle; means for sensing a traveling direction of the vehicle; means for sensing whether the vehicle is running in any one of a forward direction and a backward direction; means for finding direction guide information based on the current position, the traveling direction, and an orientation of the vehicle; and means for displaying the direction guide information.

(2) The means for finding the direction guide information includes: means for finding the direction guide information based on the current position and the traveling direction of the vehicle; and means for correcting the direction guide information by an angle equivalent to 180° when the vehicle is running in the backward direction.

According to the aforementioned feature (1), whether the vehicle is running in the forward direction or the backward direction is found, and the direction guide information is found in consideration of not only the current position and the traveling direction but also the orientation of the vehicle. Accordingly, it is possible to properly display the direction guide information without mounting, on the vehicle, a gyro sensor for sensing the orientation of the vehicle.

According to the aforementioned feature (2), accurate direction guide information according to the orientation of the vehicle can be easily found through a simple calculation.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
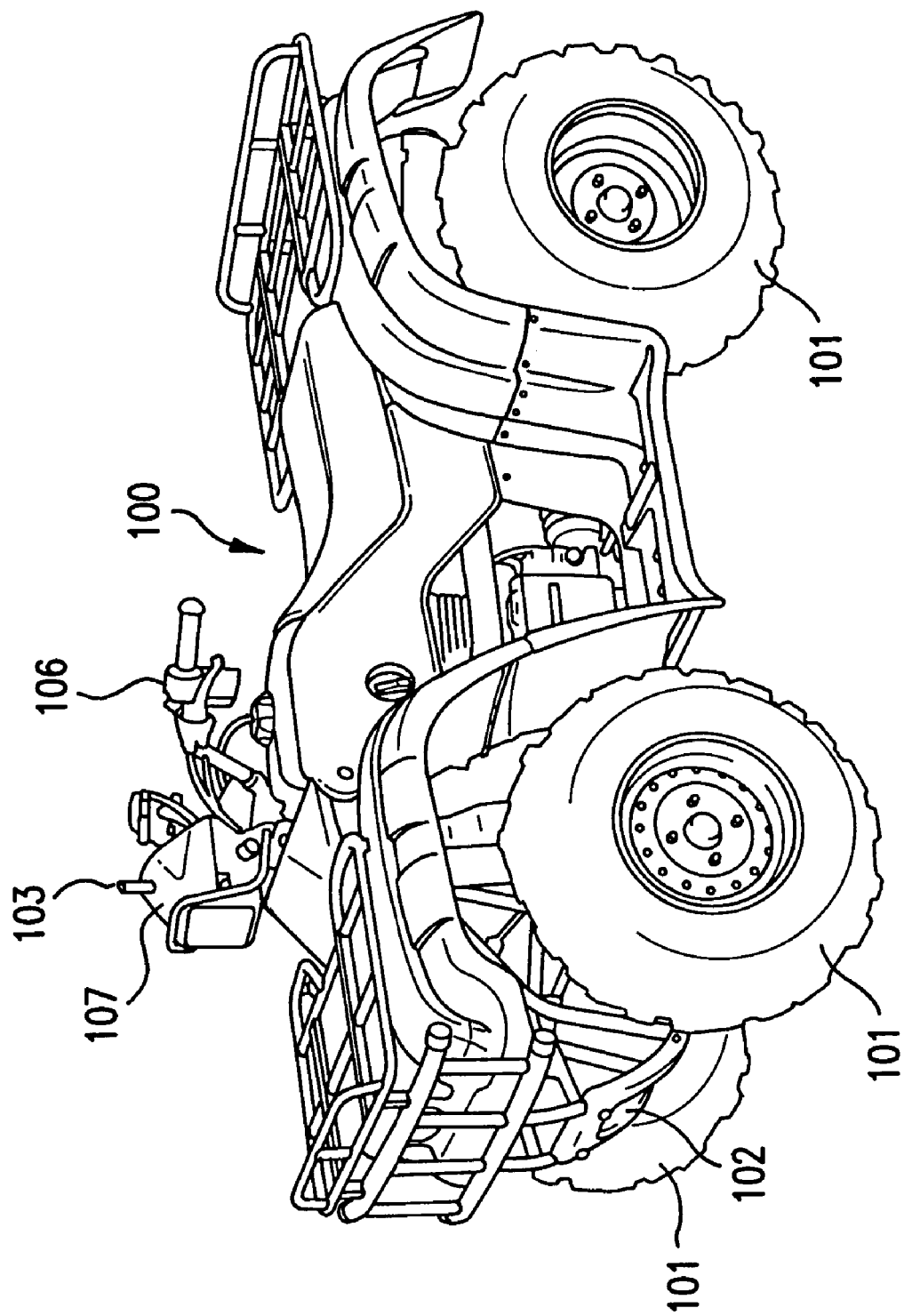
FIG. 1 is a perspective view of a saddle-type buggy car for a rough terrain on which a vehicle navigation system of the present invention is mounted.

FIG. 1 is a perspective view of a saddle-type buggy car 100 for a rough terrain on which a vehicle navigation system of the present invention is mounted.

The buggy car 100 of the present invention exhibits high hill-climbing performance and high traveling performance by making full use of large-diameter wheels 101, an under cover 102, a four-wheel drive mechanism, and the like. A meter unit 107 is provided in the middle of a handlebar 106. A helical-type or patch-type GPS receiving antenna 103 is stood toward the sky on the top of the meter unit 107. The saddle-type buggy car 100 is often used in a rough terrain in which the attitude thereof greatly changes while running. However, GPS radio waves can be favorably received despite the change in the attitude by adopting as the receiving antenna 103 a helical antenna with low directivity.

Figures 2, 3:
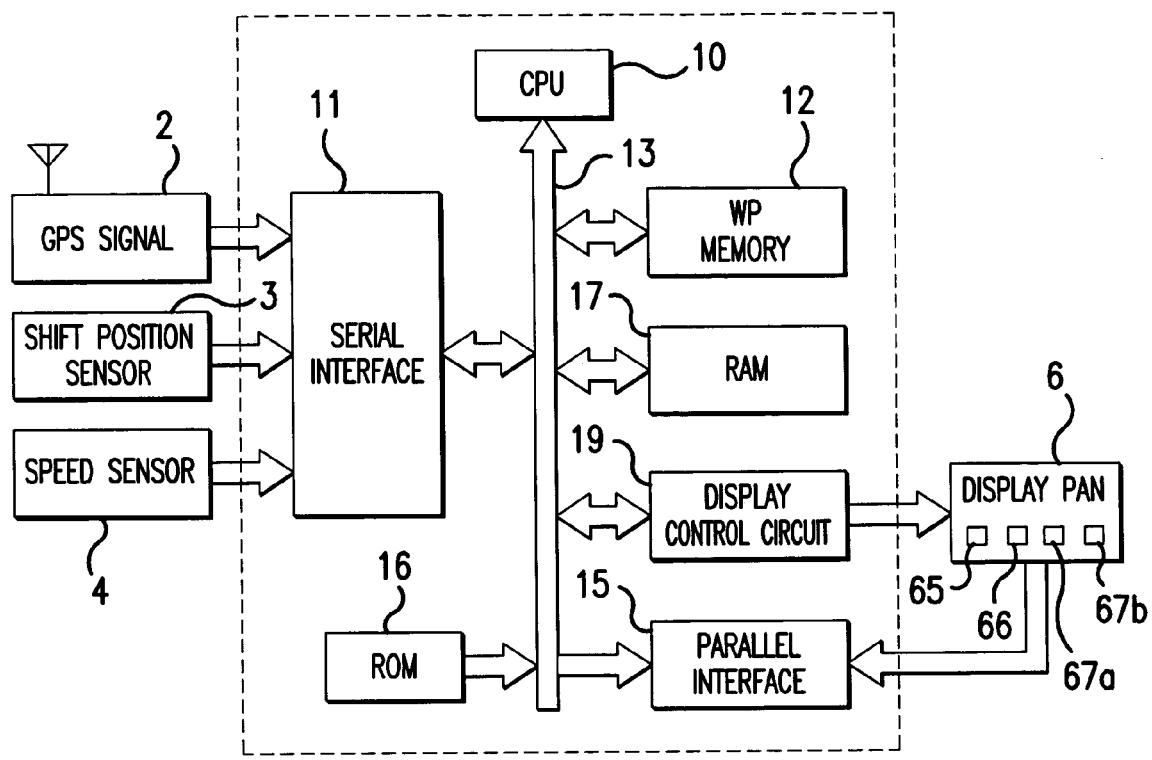
FIG. 2 is a block diagram showing the configuration of the main part of the vehicle navigation system according to the present invention.
FIG. 3 is a view schematically representing the stored contents of a WP memory.

FIG. 2 is a block diagram showing the configuration of the main part of the navigation system 1 mounted on the buggy car 100. A GPS receiver 2 periodically receives GPS signals transmitted from a plurality of artificial satellites. A shift position sensor 3 senses a shift position. A speed sensor 4 senses the traveling speed of the vehicle based on the amount of wheel rotation. The GPS receiver 2, the shift position sensor 3, and the speed sensor 4 are connected to a system bus 13 through a serial interface 11.

A CPU 10 calculates the current position (latitude and longitude) of the vehicle and the current time based on the plurality of GPS signals received by the GPS receiver 2 and senses the traveling direction based on a history of the current position and information obtained from the speed sensor 4. The CPU 10 further calculates a relative positional relationship between a WP already registered in a way point (WP: relay point) memory 12 and the current position thereof. A RAM 17 provides a work area for the CPU 10.

A display control circuit 19 outputs the direction, distance, and the like of the WP viewed from the current position to a display panel 6 of the meter unit 107. Switches 65, 66, 67a, and 67b of the display panel 6 are connected to the system bus 13 through a parallel interface 15.

FIG. 3 is a view schematically representing stored contents of the WP memory 12. A storage area is reserved for each WP number, which is identification information of a WP. In each storage area, the latitude and longitude of a WP are stored as positional information of each WP.

Figure 4:
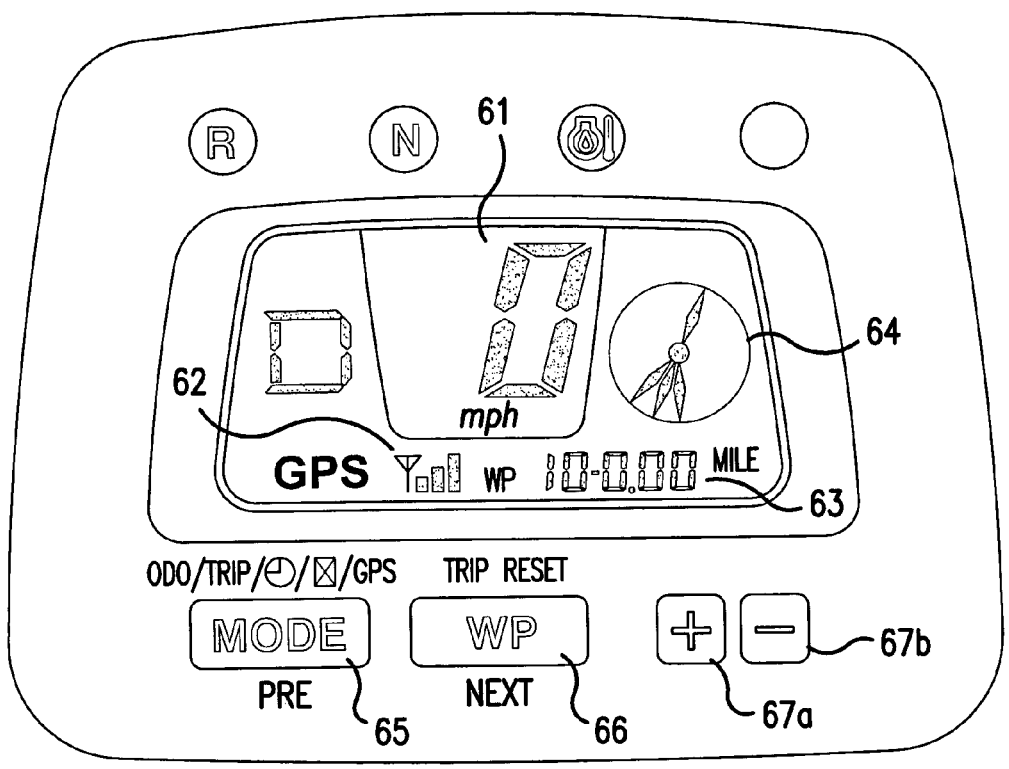
FIG. 4 is a view showing a display example (NAVI mode) of a display panel.
Figure 5:
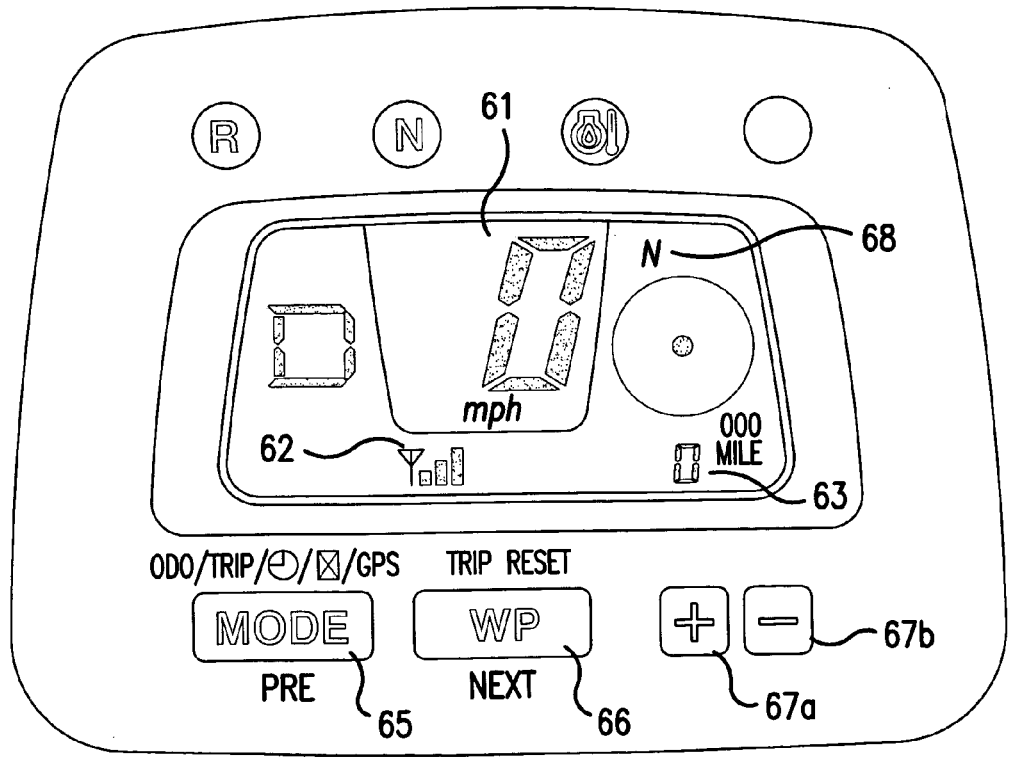
FIG. 5 is a view showing a display example (compass mode) of the display panel.

FIGS. 4 and 5 are views showing display examples of the display panel 6.

The navigation system of the present embodiment includes a "navigation (NAVI) mode" in which the direction of a WP or the final destination is displayed in sixteen (16) directions and a "compass mode" in which the orientation of the traveling direction is displayed in eight (8) directions.

In the NAVI mode, as shown in FIG. 4, a speed display area 61, a positioning status display area 62 in which the positioning status of the GPS is displayed, and a direction display area 64 in which the direction of a WP or the final destination is displayed in sixteen (16) directions, are displayed. In a multiplex display area 63, the number of the way point (WP: relay point) currently selected and the distance to the WP are displayed.

In the compass mode, as shown in FIG. 5, the speed display area 61, the positioning status display area 62 in which the positioning status of the GPS is displayed, and a compass display area 68 in which the current traveling direction is displayed in eight (8) directions (north (N)-northeast (NE)-east (E)-southeast (SE)-south (S)-southwest (SW)-west (W)-northwest (NW)), are displayed. In the multiplex display area 63, an odometer (ODO), a tripmeter (TRIP), elapsed time (HOUR), or the current time is selectively displayed.

Figure 6:
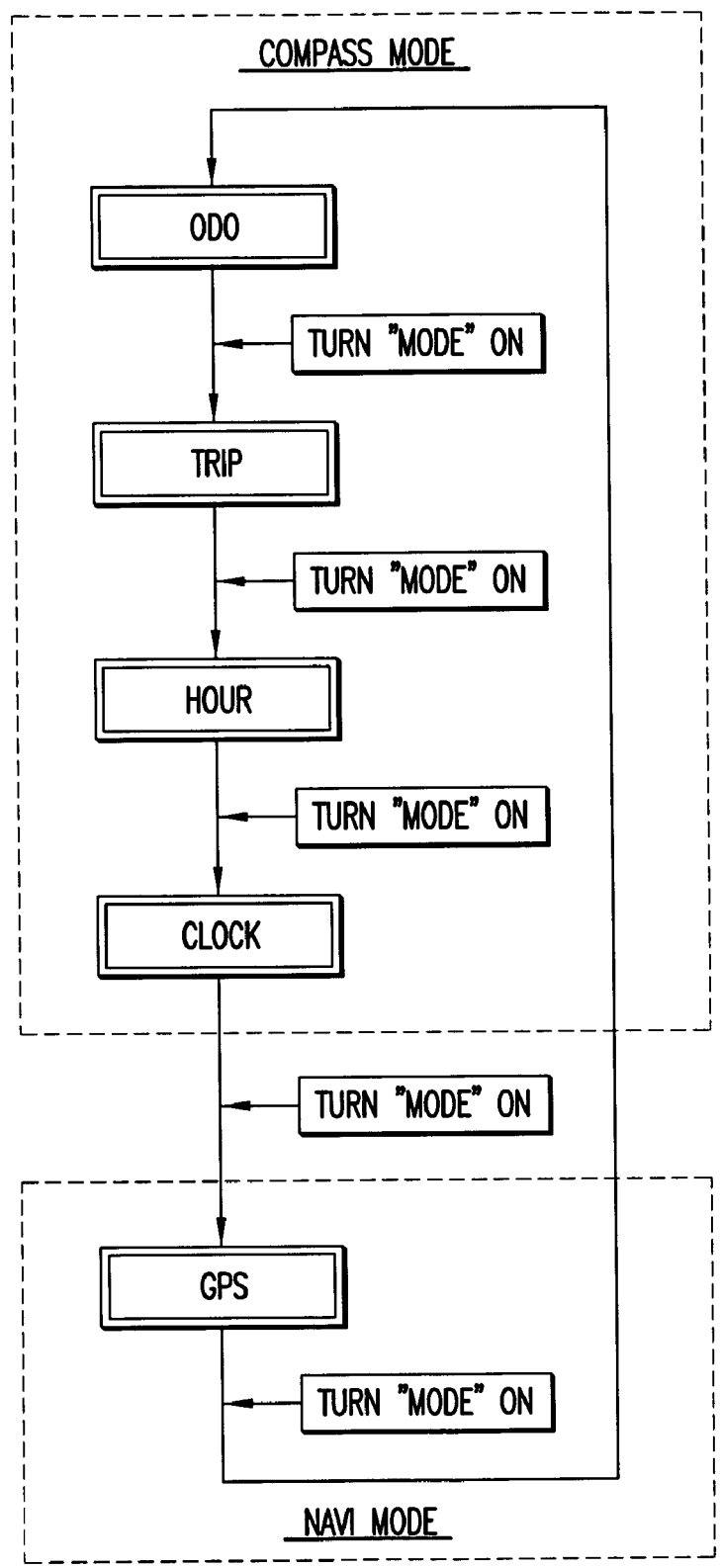
FIG. 6 is a view showing a display example of the display panel transitioning in response to operations of a MODE switch.

FIG. 6 is a view showing a display example of the display panel 6 transitioning in response to operations of the MODE switch 65. For example, when the "MODE" switch 65 is operated in an ODO display state of the compass mode, the compass mode is maintained, but only the multiplex display area 63 transitions to TRIP display, HOUR display, and clock display. When the "MODE" switch 65 is further operated, the compass mode is changed to the NAVI mode. When the "MODE" switch 65 is operated in the NAVI mode, the ODO display state of the compass mode is restored.

Figure 7:
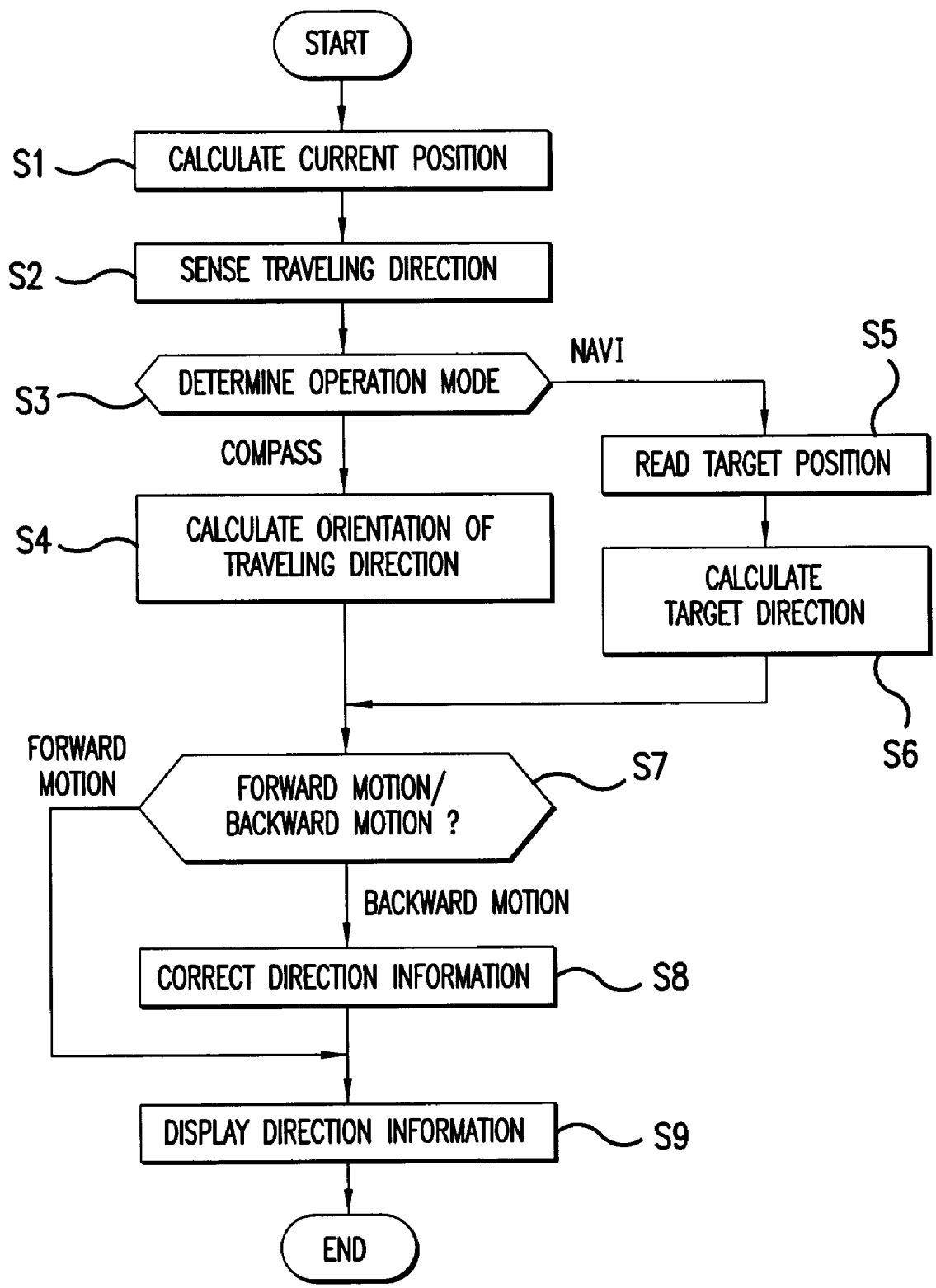
FIG. 7 is a flowchart showing operations of the present embodiment.

FIG. 7 is a flowchart showing operations of the present embodiment and mainly shows the procedure of a process executed by the CPU 10 in accordance with a control program stored in the ROM 16.

In step S1, information contained in a plurality of GPS signals received by the GPS receiver 2 is substituted into predetermined simultaneous equations to calculate the current position (latitude and longitude) of the vehicle and the current time. In step S2, the traveling direction of the vehicle is sensed based on the history of the sensed current position and the information obtained from the speed sensor 4. In step S3, the current operation mode of the navigation system is determined. If the current operation mode is the "compass mode," the process goes to step S4, and the orientation of the traveling direction is calculated as direction guide information based on the current position and the traveling direction.

On the other hand, if the current operation mode is the "NAVI mode," the process goes to step S5, and a target position T, which is separately set, is read. In step S6, a target direction is calculated as direction guide information based on the current position and the target position T.

In step S7, whether the motion of the vehicle is forward or backward is determined based on an output signal of the shift position sensor 3. If the motion of the vehicle is forward, the process goes to step S9 without correcting the direction guide information. Meanwhile, if the motion of the vehicle is backward, the process goes to step S8 in order to correct the direction guide information. In step S8, the found direction guide information (orientation or target direction) is corrected by an angle equivalent to 180°.

Figures 8, 9:
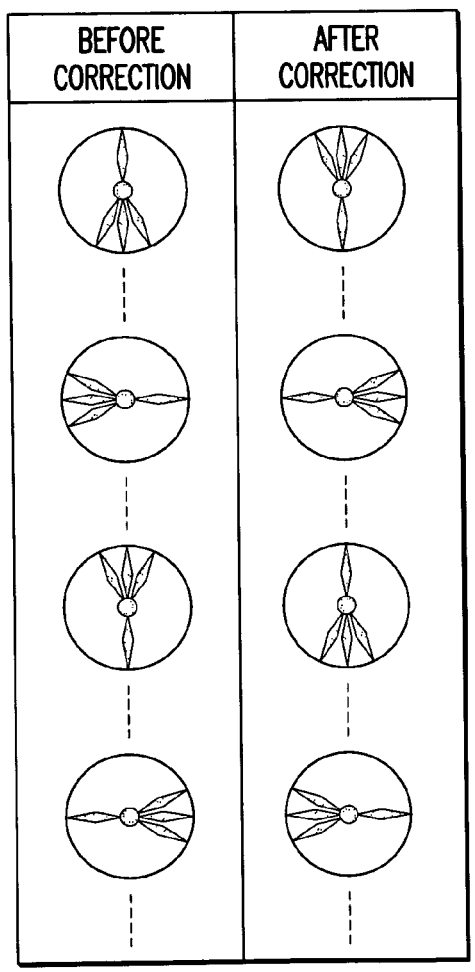
FIG. 8 is a view showing the correspondence between orientations before and after correction.
FIG. 9 is a view showing the correspondence between target directions before and after correction.
Figure 10:
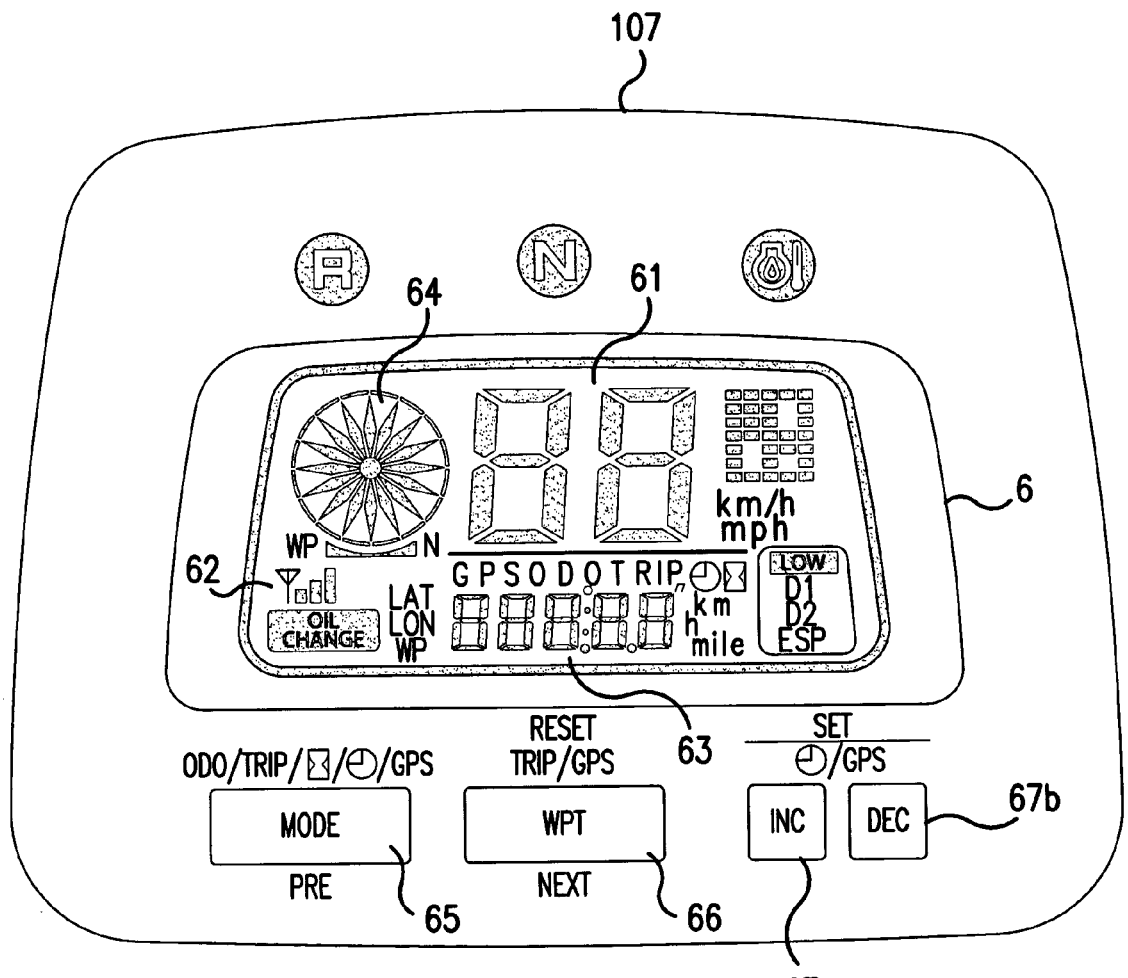
FIG. 10 is a view showing the configuration of a display panel of a known vehicle navigation system.
Figure 11:
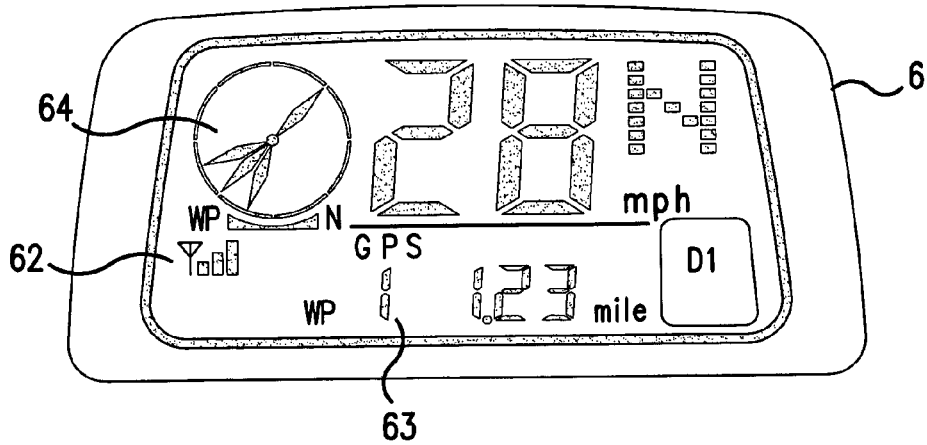
FIG. 11 is a view showing a display example of the display panel when a vehicle is running.
Figure 12A:
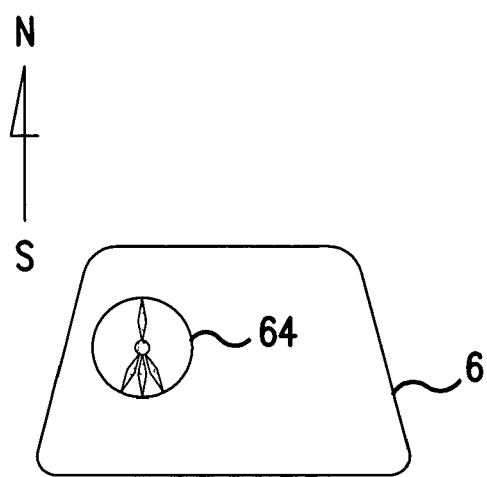
FIGS. 12(a) and (b) are views for explaining a problem of the background art.
Figure 12B:
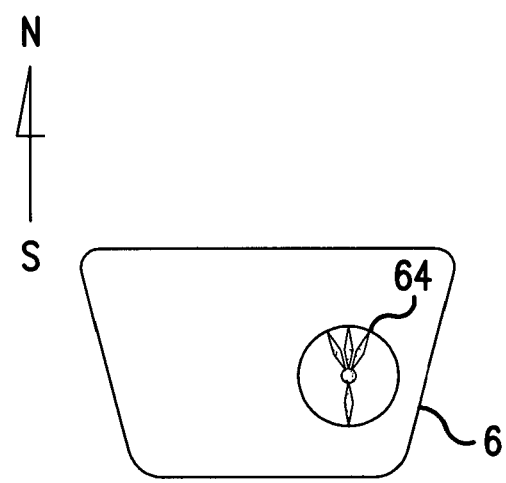
Figures 13A, 13B:
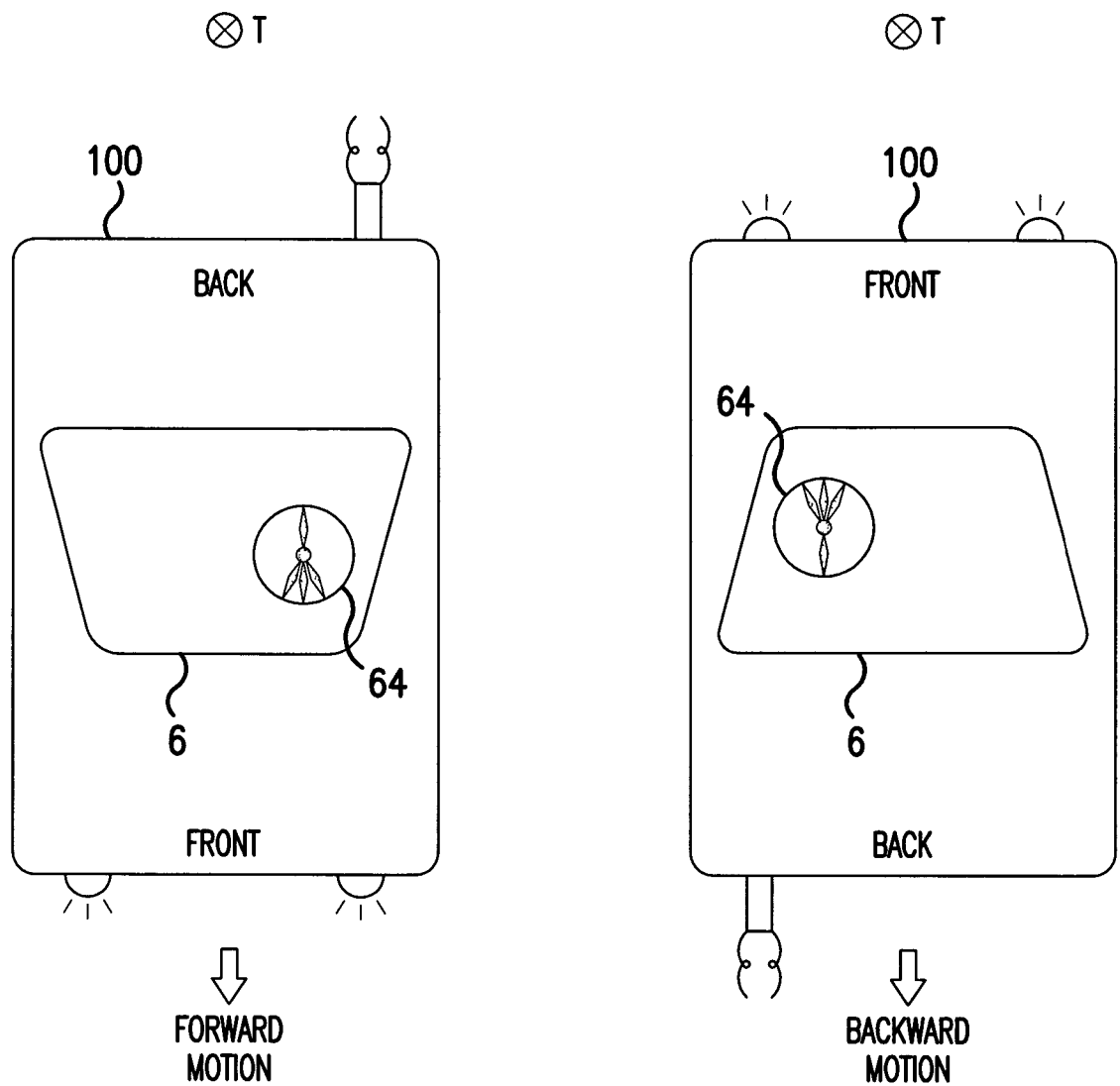
FIGS. 13(a) and (b) are views for explaining a problem of the background art.

That is, if the current operation mode is the compass mode and the found orientation is "S," the orientation is corrected to the orientation "N," which is different from "S" by 180°. Similarly, if the found orientation is "NE," the orientation is corrected to the orientation "SW," which is different from the "NE" by 180°. FIG. 8 shows the correspondence between orientations before and after correction.

On the other hand, if the current operation mode is the NAVI mode, the found target direction is rotated by 180° as shown in the examples in FIG. 9. In step S9, the orientation or an arrow is displayed as direction guide information at a predetermined position on the display panel 6 depending on the current operation mode.

Incidentally, in the above-described embodiment, a description has been made on the assumption that whether the motion of the vehicle is forward or backward is determined based on the shift position. However, the determination may be made based on the direction of wheel rotation.

According to the present invention, the following effects can be achieved.

(1) Direction guide information is found in consideration of not only the current position and the traveling direction but also the orientation of the vehicle by finding whether the vehicle is running in the forward direction or the backward direction. Accordingly, it is possible to properly display direction guide information even when the vehicle is moving backward, without mounting, on the vehicle, a gyro sensor for sensing the orientation of the vehicle.

(2) When the vehicle is moving backward, the direction guide information found based on the current position and traveling direction of the vehicle is corrected by an angle equivalent to 180°. Accordingly, accurate direction guide information can be properly displayed through a simple process.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle navigation system comprising:
    means for a vehicle operator to set a target destination;
    means for sensing a current position of a vehicle;
    means for sensing a traveling direction of the vehicle:
    means for sensing whether the vehicle is running in any one of a forward direction and a backward direction;
    means for finding direction guide information based on the current position, the traveling direction, and an orientation of the vehicle, the orientation of the vehicle being found based on a shift position;
    display means for alternatively displaying the target direction together with a specific waypoint number, and displaying the traveling direction; and
    means for switching alternatively from display of the target direction together with the specific waypoint number, to a display of the traveling direction,
    wherein the display means is adapted to display the target direction without change when the vehicle changes between running in any one of the forward direction and the backward direction.

2. The vehicle navigation system according to claim 1, wherein the means for finding the direction guide information comprises:
    means for finding the direction guide information based on the current position and the traveling direction of the vehicle; and
    means for correcting the direction guide information by an angle equivalent to 180° when the vehicle is running in the backward direction.

3. The vehicle navigation system according to claim 2, wherein the direction guide information is the orientation of the traveling direction, and
    when the orientation found based on the current position and the traveling direction of the vehicle is any one of east, west, south, and north, the correcting means corrects the orientation to west, east, north, and south, respectively.

4. The vehicle navigation system according to claim 2, wherein the direction guide information is the target direction, and
    the correcting means corrects the target direction found based on the current position and the traveling direction of the vehicle by 180°.

5. The vehicle navigation system according to claim 1, wherein the target direction to the target destination is separately set by the vehicle operator.

6. The vehicle navigation system according to claim 1, wherein the display means includes:
    a direction display area for displaying the target direction as one of only sixteen directions; and
    a compass display area for displaying the traveling direction as one of only eight directions,
    wherein the means for switching alternatively switches from displaying the target direction to displaying the traveling direction.

7. The vehicle navigation system according to claim 1, wherein the display means:
    includes a speed display area adapted to continuously displaying a vehicle speed when the means for switching alternatively switches from the display of the target direction together with the specific waypoint number to the display of the traveling direction.

8. A method for displaying directional guide information of a vehicle navigation system comprising the steps of:
setting a target destination by a vehicle operator;
sensing a current position of the vehicle;
sensing a traveling direction of the vehicle;
sensing whether the vehicle is running in any one of a forward direction and a backward direction;
finding direction guide information based on the current position, the traveling direction, and an orientation of the vehicle; and
displaying the direction guide information, the direction guide information including a target direction to the target destination designated by the operator,
the target direction to the target destination being displayed remaining unchanged when the vehicle changes between running in any one of the forward direction and the backward direction.

9. The method for displaying directional guide information of a vehicle navigation system according to claim 8, wherein the step of finding the direction guide information comprises:
finding the direction guide information based on the current position and the traveling direction of the vehicle; and
correcting the direction guide information by an angle equivalent to 180° when the vehicle is running in the backward direction.

10. The method for displaying directional guide information of a vehicle navigation system according to claim 9,
wherein the direction guide information includes an orientation of the traveling direction, and
when the orientation found based on the current position and the traveling direction of the vehicle is any one of east, west, south, and north, the correcting means corrects the orientation to west, east, north, and south, respectively.

11. The method for displaying directional guide information of a vehicle navigation system according to claim 9, further comprising the step of:
correcting the target direction based on the current position and the traveling direction of the vehicle by 180°.

12. The method for displaying directional guide information of a vehicle navigation system according to claim 9, wherein the orientation of the vehicle is found based on a direction of wheel rotation.

13. The method for displaying directional guide information of a vehicle navigation system according to claim 8, wherein the orientation of the vehicle is found based on a shift position.

14. The method for displaying directional guide information of a vehicle navigation system according to claim 8, wherein the target direction to the target destination is separately set by the vehicle operator.

15. A vehicle navigation system comprising:
means for a vehicle operator to set a target destination;
means for sensing a current position of a vehicle;
means for sensing a traveling direction of the vehicle;
means for sensing whether the vehicle is running in any one of a forward direction and a backward direction;
means for finding direction guide information based on the current position, the traveling direction, and an orientation of the vehicle, the orientation of the vehicle being found based on a direction of wheel rotation;
display means for alternatively displaying the target direction together with a specific waypoint number, and displaying the traveling direction; and
means for switching alternatively from a display of the target direction together with the specific waypoint number, to a display of the traveling direction,
wherein the display means is adapted to display the target direction without change when the vehicle changes between running in any one of the forward direction and the backward direction.

16. The vehicle navigation system according to claim 15, wherein the means for finding the direction guide information comprises:
means for finding the direction guide information based on the current position and the traveling direction of the vehicle; and
means for correcting the direction guide information by an angle equivalent to 180° when the vehicle is running in the backward direction.

17. The vehicle navigation system according to claim 16, wherein the direction guide information is the orientation of the traveling direction, and
when the orientation found based on the current position and the traveling direction of the vehicle is any one of east, west, south, and north, the correcting means corrects the orientation to west, east, north, and south, respectively.

18. The vehicle navigation system according to claim 16, wherein the direction guide information is the target direction, and
the correcting means corrects the target direction found based on the current position and the traveling direction of the vehicle by 180°.

19. The vehicle navigation system according to claim 15, wherein the display means includes:
a direction display area for displaying the target direction as one of only sixteen directions; and
a compass display area for displaying the traveling direction as one of only eight directions,
wherein the means for switching alternatively switches from displaying the target direction to displaying the traveling direction.

20. The vehicle navigation system according to claim 15, wherein the display means:
includes a speed display area adapted to continuously displaying a vehicle speed when the means for switching alternatively switches from the display of the target direction together with the specific waypoint number to the display of the traveling direction.

* * * * *